1/26/88 XR 4,721,954

United States Patent [19]

Mauch

[11] Patent Number: 4,721,954

[45] Date of Patent: Jan. 26, 1988

[54] KEYPAD SECURITY SYSTEM

[75] Inventor: Barbara J. Mauch, Inglewood, Calif.

[73] Assignee: Marlee Electronics Corporation, Inglewood, Calif.

[21] Appl. No.: 811,962

[22] Filed: Dec. 18, 1985

[51] Int. Cl.[4] .......................... G06F 7/04; G06K 5/00

[52] U.S. Cl. .......................... 340/825.31; 340/825.32; 235/382

[58] Field of Search .................... 340/825.31, , 825.32, 340/825.34, 825.3, 825.06, 506; 235/382, 382.5; 361/172

[56] References Cited

U.S. PATENT DOCUMENTS

| | | | |
|---|---|---|---|
| 3,622,991 | 11/1971 | Lehrer et al. . | |
| 3,694,810 | 9/1972 | Mullens et al. . | |
| 3,754,213 | 8/1973 | Morroni et al. | 340/825.32 |
| 3,838,395 | 9/1974 | Suttill, Jr. et al. | 340/825.31 |
| 3,866,173 | 2/1975 | Moorman et al. | 340/825.31 |
| 3,906,447 | 9/1975 | Crafton | 340/825.31 |
| 3,953,769 | 4/1976 | Sopko . | |
| 4,072,929 | 2/1978 | Garmong . | |
| 4,148,092 | 4/1979 | Martin | 361/172 |
| 4,149,212 | 4/1979 | Willach . | |
| 4,157,534 | 7/1979 | Schachter . | |
| 4,218,690 | 8/1980 | Ulch et al. | 340/825.31 |
| 4,283,859 | 8/1981 | Roland . | |
| 4,415,893 | 11/1983 | Roland et al. . | |
| 4,432,142 | 2/1984 | Korsak . | |
| 4,433,487 | 2/1984 | Roland . | |
| 4,477,806 | 10/1984 | Mochida et al. . | |
| 4,532,507 | 7/1985 | Edson et al. | 340/825.31 |
| 4,634,846 | 1/1987 | Harvey et al. | 235/382 |

*Primary Examiner*—Ulysses Weldon
*Assistant Examiner*—Ralph E. Smith
*Attorney, Agent, or Firm*—Nilsson, Robbins, Dalgarn, Berliner, Carson & Wurst

[57] ABSTRACT

A system for securing a complex with a plurality of lockable access points has a stand-alone keypad-operated remote station at each access point for communication with a desk station through a local area network. In a preferred embodiment the access points are room doors of a hotel or an apartment building and the rooms are divided into groups having separate controllers to relay messages between stations and perform control functions. The desk station then has a keypad for entry of access code information chosen by a guest and a separate keyboard for assignment of a room number by a clerk. The desk station stores the access code at a remote station located at the assigned room, whereupon the room can be unlocked only by manual entry of the code on a keypad of the remote station. Each remote station functions independently to open a door associated with it and remains operable to open the door even if other portions of the system malfunction.

35 Claims, 10 Drawing Figures

KEYPAD SECURITY SYSTEM

BACKGROUND OF THE INVENTION

The present invention relates generally to the field of electronic security systems and, more particularly, to a cost effective keypad entry system which provides high levels of security, convenience and flexibility in operation.

Individual push-button operated locks have been used to secure doors of dwellings and vehicles. Such locks are described in U.S. Pat. Nos. 3,953,769, 4,149,212, and 4,477,806, each of which discloses a stand-alone push-button lock which is programmed at the lock itself to open in response to an access code.

The only push-button or keypad operated system known to applicant for securing a large number of doors was manufactured by Tool Research Engineering of Santa Ana, California, under the name "Digikey". The Digikey system has a "dummy" keypad without local storage or processing capabilities at each guest door of a hotel. The keypads are connected together as an operating unit by a large number of wires leading to a front desk computer.

In the Digikey system, a four-digit number entered on a room keypad is transmitted to the front desk computer which makes the decision as to whether the number is a valid access code. If the number is valid, a signal from the processing unit unlocks the door. The valid access code for a room is chosen by the guest when he checks in to the hotel. To do so, he enters a four-digit number onto a keypad at the front desk. The number is then stored in the front desk computer for use in opening the door. As far as applicant is aware, there is no provision in the Digikey system for deviating from a four-digit entry code, and only one code can be stored for each room.

Other systems for controlling access through doors of a large building complex use machine-readable "card keys" which may or may not resemble mechanical keys. Such devices are described in U.S. Pat. Nos. 3,622,991; 3,694,810; 4,157,534; and 4,415,893. Of course, the use of physical keys of any type carries with it one of the basic disadvantages of traditional mechanical locks, i.e., that the number of possible key variations is only as great as the number of keys used. While some of the physical key systems listed above have storage and comparison capabilities at each door to be opened, many of them are cumbersome in their implementation. For example, the devices of U.S. Pat. Nos. 3,622,991 and 4,157,534 require extensive hardwire networks or microwave transmission devices for communication. Complex hardwire networks are unsuitable for large installations and are difficult to install in existing buildings. U.S. Pat. No. 4,415,893 is unique in that it repeatedly states that it is desirable to retain the mechanical parts of a conventional door lock, with the pin tumbler replaced by an electronic reading cylinder of identical size. This is proposed for the purpose of maintaining the "feel" of a mechanical lock and clearly teaches away from development of a sophisticated keyless system.

Therefore it is desirable in many applications to provide a highly secure system for controlling and monitoring the opening of a large number of doors in a cost-effective manner.

SUMMARY OF THE INVENTION

The present invention relates to a system for securing a complex having a desk location and a plurality of lockable access points, including: at least one desk station at the desk location, each desk station having a desk keypad; a remote station at each of the access points, each remote station having a remote station keypad; a network for providing bidirectional communication between the desk station and the remote stations; the desk station comprises structure for receiving an access code and a location code entered on the desk keypad, and structure for generating and transmitting serial messages containing the access code and the location code over the communication means; each remote station comprising structure responsive to messages containing a preselected location code characteristic of the remote station to receive and store access codes contained within the messages, structure for receiving access data entered on the keypad of the remote station and comparing the access data to the access codes stored at the remote station, and structure for generating a signal to unlock the access point at which the remote station is located if the access data matches one of the access codes.

In a preferred embodiment, the transmitting structure of the desk station is constructed to transmit the access code and the location code as a serial message over common wiring buses of the network, to and from remote stations having storage and data processing capability. In a further embodiment, the remote stations are divided into a plurality of groups and the system includes a separate controller station for each group. Each controller station is responsive to messages which identify remote stations within its group to relay access codes contained within the messages along the network to the remote stations. The controller stations also monitor the status and activity of the remote stations to which they are assigned and act to disable one or more of the stations upon detection of a preselected pattern of erroneous data entries.

The system of the present invention combines a number of significant features to form a keyless entry system which maximizes security and flexibility while keeping cost at a minimum. The system uses keypad entry devices having local storage and processing capabilities, and connects the devices together with a central station by a serial communication channel. The cost of the system is reduced by offloading some of its intelligence from individual remote or "door" processors to controllers assigned to a group of door processors. This is done without impairing the ability of each door processor to open an associated door without communicating with other entities. The use of formatted serial transmission between units also reduces the requirements for interconnecting wires and makes the system easier to retrofit to existing hotels and other facilities.

The present system is convenient for hotel guests and staff alike, while maintaining a higher level of security than the prior art. For example, a dual entry desk station permits a guest to choose a digital code known only to him and to enter the code on a desk keypad as the clerk assigns a room number on a separate desk keyboard. The guest chooses both the content and length of the number that he will use as an entry code, and does so without disclosing the number to anyone else at the desk station. The code is not stored at the front desk, except temporarily for the purpose of transmitting it to a central security station and to a door processor at the room that the guest will occupy.

The system of the present invention also has a high tolerance for fault in its components because the room stations act independently of the rest of the system to open room doors. A fault occurring in one portion of the system does not significantly impair security or affect the ability of a guest to enter a room in another portion of the system. Unaffected room stations remain fully operational to compare entered data to stored entry codes and open doors when a match occurs.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENTS

Figure 1:
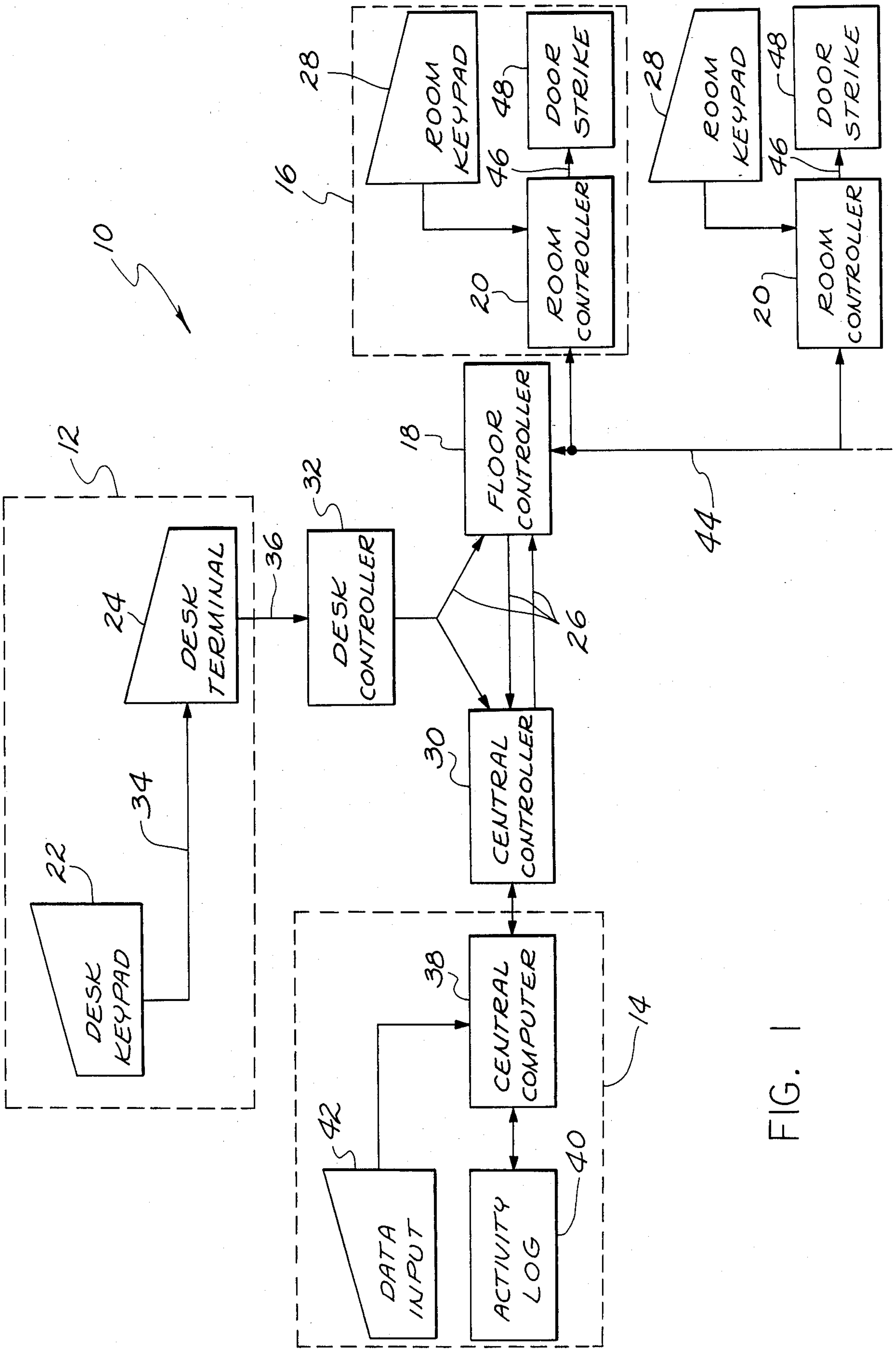
FIG. 1 is a simplified block diagram depicting the flow of information between various components of the security system constructed according to a preferred embodiment of the present invention.

As illustrated in FIG. 1, a security system 10 constructed according to a preferred embodiment of the present invention has at least one desk station 12, a central security station 14 and a plurality of room stations 16 located near different lockable doors of rooms in a building complex (not shown). The system 10 is described by way of example as a system for securing guest rooms in a hotel, although the principles discussed herein are also applicable to apartment buildings, industrial complexes, governmental installations and the like. In all such cases, it is desirable to provide security by controlling access through a large number of doors.

The room stations 16 are divided by floors into groups serviced by respective floor controllers 18. Each room station has a room controller 20 with local storage and data processing capabilities for controlling access through an associated room door. When a guest "checks in", he enters an access code of his choice on the desk keypad 22 and the clerk enters a room number and appropriate guest information on an associated desk terminal 24. The access code chosen by the guest is transmitted to a room station of the assigned room along a serial bus 26 which includes the appropriate floor controller 18.

After a code is stored at a room station, the guest can unlock his room by entering access data corresponding to one of the stored codes on a keypad 28 of the room station. The room controller 20 compares the entered data to that stored in its memory and opens the door if a match exists. It then reports the opening to the appropriate floor controller 18 and to the central station 14, which monitor all activity of the system.

A door controlled by the system 10 can be unlocked only by entering a valid access code on a room keypad 28 of the appropriate room stations. The desk station 12 and the central station 14 are in full bidirectional communication with the room stations along the local area network which includes the serial channel 26, but are unable to unlock doors without entry of a valid access code at the room itself. Furthermore, a room station is capable of unlocking a door independently of the rest of the system. It relies on its own memory and need not communicate with any other component to operate. Thus, security is maintained even if other components of the system malfunction.

In addition to the floor controllers 18, a central controller 30 and a desk controller 32 are provided for bidirectional communication between the central station 14, the desk station 12 and the room station 16. The central controller 30 and the desk controller 32 act primarily as message handlers which reformat and translate messages to and from the stations with which they are associated so that messages transmitted between the stations are compatible with the bus 26 and with the receiving stations.

The flow of information within the system 10 can be understood most clearly by reference to FIG. 1, wherein storage of a valid access code entered by the guest on the desk keypad 22 passes to the desk terminal 24 along a path 34. This code can be any whole number from four to nine digits in length, as the guest chooses. It is delimited by an asterisk ("*") entered by the guest immediately before it and a pound symbol ("#") entered by the guest immediately after it. The desk terminal 24 adds the appropriate room number and guest information, as entered by the desk clerk, and passes the combination of the access code and the information entered by the clerk to the desk controller 32 along a path 36.

Figure 4A:
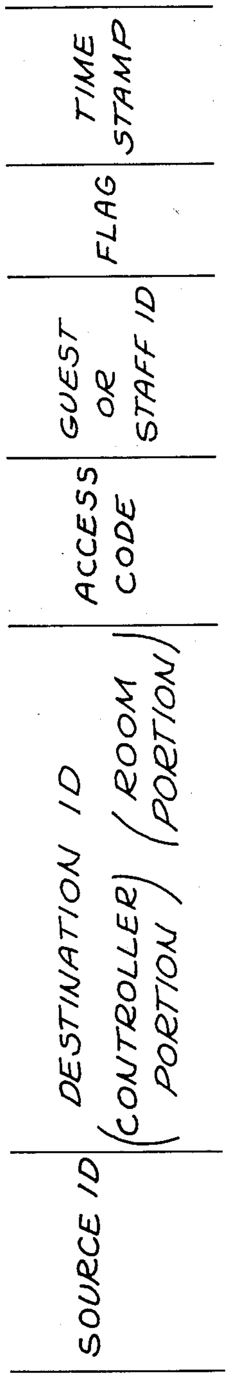
FIGS. 4A and 4B are generalized representations of typical messages transmitted along the bidirectional communication network of the system of FIG. 1.

The desk controller 32 is a microprocessor-controlled device which assembles the information received from the desk terminal 24 into a suitable message format for transmission to the floor controllers 18 and the central site 14 along the serial bus 26. In the terminology of data transfer, the desk controller 32 assembles the information into an appropriate message format which indicates its source and its destination and which is understandable by the central controller 30 and the floor controllers 18. An example of such a message is illustrated in FIG. 4A, wherein the first field is a number identifying the source of the message (SOURCE ID) and the second field identifies the ultimate destination of the message (DESTINATION ID). In the case of a message to store a valid access code at a specific room controller 20, the DESTINATION ID field contains a first portion identifying the floor on which a specific room station is found and a second number identifying the station itself. The next two fields correspond to the chosen access code and a number identifyng the guest. The guest identification number is followed by a "flag"

which determines the meaning of the message, i.e., that the access code is a guest code to be stored at a preselected location. The last field is a "time stamp" which is found in all messages emanating from a controller of the system. The time stamp performs a synchronizing function, as discussed in more detail below.

The desk controller 32 transmits messages of the format described in FIG. 4A along the serial bus 26 to the central controller 30 and the floor controllers 18. Although a single message might be used for this purpose, the desk controller 32 preferably sends one message to the floor controllers 18 and another message to the central controller 30. The only difference between the messages is their DESTINATION ID numbers. The central controller 30 reformats and translates the message to render it compatible with a central computer 38 of the central station. The central computer adds the information to an activity log 40 which may take the form of a video display terminal, a print-out or electronic storage. The computer also receives input from a data input terminal 42 for ultimate control of the system.

The data input terminal 42 can be used in much the same manner as the desk keypad 22 and the desk terminal 24 to enter additional entry codes for storage at one or more of the room stations 16. Access codes entered by the terminal 42 can be identified as codes of guests or staff members, including houskeeping, maintenance and security personnel. The necessary information is then passed by the central computer 38 to the central controller 30, where it is placed in the message format and coding required along the serial bus 26. The format is essentially the same as that given in FIG. 4A, except that the fourth field contains information identifying a staff person rather than a guest and the fifth field contains a flag identifying the message as one containing a staff entry code for storage at a room station.

The floor controllers 18 examine messages from the desk controller 32 and the central controller 30 to determine which controller is identified in the DESTINATION ID field. The identified controller receives the message and changes its format, as required, before transmitting it to serial floor bus 44 by which the floor controller 18 communicates with a group of the room stations 16. The correct room station then recognizes its identification number in the message and stores the entry code in a memory location identified by the message "flag". The other room stations 16 do not respond to the message because it does not identify them as the intended destination.

Figure 4B:
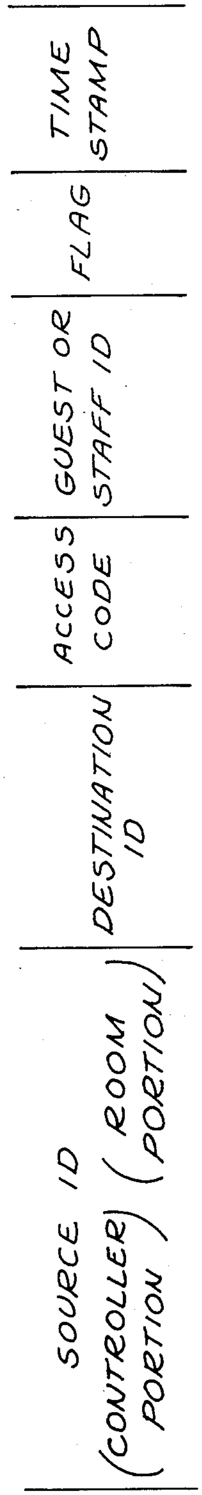

When a person enters a number having from four to 9 digits on the room keypad 28, the number is compared by the associated room controller 20 to all valid access codes within its memory. If the number matches a stored access code in both content and length, a "door open" command is transmitted along a path 46 to a door strike mechanism 48 which unlocks the door of the guest room. At the same time, the room controller 20 transmits a "valid entry" message which identifies the matching access code to the central station 14. The format of the valid entry message is depicted generally in FIG. 4B, in that both the source and the destination of the message are identified and an access code is given. The principal difference of the format of FIG. 4B from that of FIG. 4A are that the SOURCE ID field is broken up into two portions and the flag in the fifth field identifies the message as a valid entry message. When received by the central station 14, the information contained in the message is placed in the activity log 40. Thus, the activity log contains information as to the location, time and access code of each room keypad entry which results in a door being unlocked.

If the data entered on the room keypad 28 does not match any of the access codes stored at the room controller 20, an "invalid entry" message is sent to the central station 14 by the room controller 20. The message contains information as to the precise data entered on the room keypad so that the central station 14 can determine whether the entry was merely an "honest" mistake or was the result of an unauthorized person attempting to enter the room. After a preselected number of invalid entries, or after an entry sufficiently far from each of the access codes to indicate that an unauthorized person is present, the central station 14 transmits a message inhibiting further operation of one or more of the room stations 16. This function can be performed in part by the floor controller 18, depending upon system design.

The central station 14 also interrogates the memories of the floor's controllers 18 to learn the status of the room stations 16 and the doors that they control. Thus, the central station 14 has all information required to maintain security throughout the system 10 in a dynamic environment.

Figure 2:
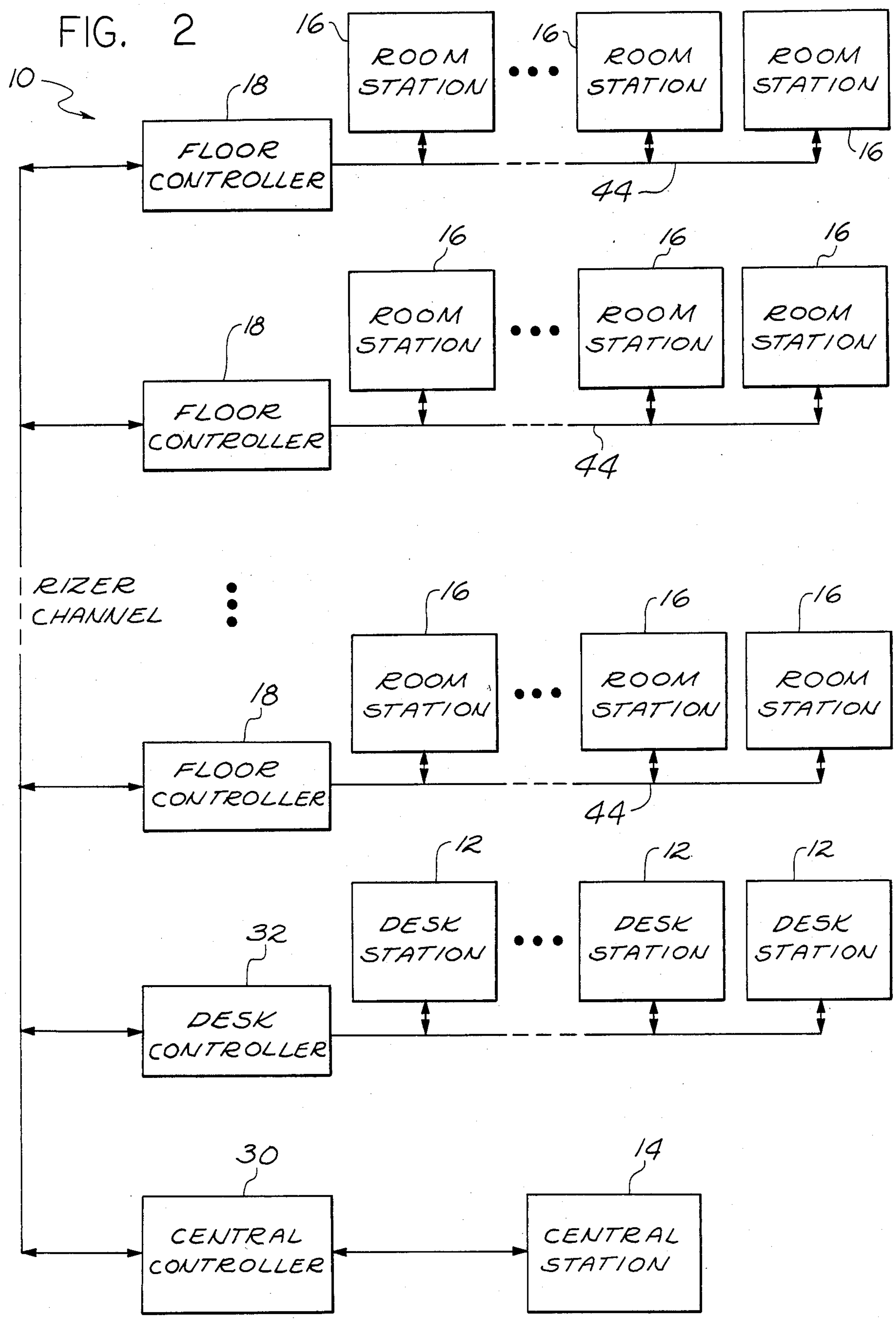
FIG. 2 is an overall block diagram showing the hardware organization of the system of FIG. 1.

FIG. 2 illustrates the general hardware configuration of the system 10, wherein a plurality of the floor controllers 18 communicate with the desk controller 32 and the central controller 30 by a serial bus 26 of the local communication network. Because the floor controllers 18 are typically located directly above one another on different floors of a building, the serial bus 26 is designated as a "rizer bus" in the figures. As described above, each floor controller 18 communicates with a different group of room stations 16 along a floor bus 44. The rizer bus 26 and the floor bus 44 are both bidirectional serial communication channels permitting messages to be transmitted in either direction between any two units of the system 10. They take the form of a very few simple conductors. In most cases four conductors suffice for each bus—two carrying messages in opposite directions, one providing system power and the last being system ground. Together they make up the local communication network of the system.

In the illustrated embodiment, the room stations 16 do not communicate directly with each other, but rather communicate exclusively with the desk stations 12, the central station 14 and the room controllers 18. This is accomplished by restricting the contents of the DESTINATION ID fields of messages emanating from the room stations. In practice, all messages generated by the room stations and the floor controllers for transmission along the rizer bus 26 contain information identifying the central controller 30 as the ultimate destination.

Although the system 10 is described herein as having a controller 18 for each floor and a group of room stations 16 interconnected by a single floor bus 44, in some circumstances it is desirable to separate the system into groups of room stations which do not coincide with the floors of a building in which it is installed. A controller similar to the floor controllers 18 is then assigned to each group of room stations 16 and is connected thereto by a room control channel without regard to what portion of a floor or what portion of the building complex the group covers.

Figure 3:
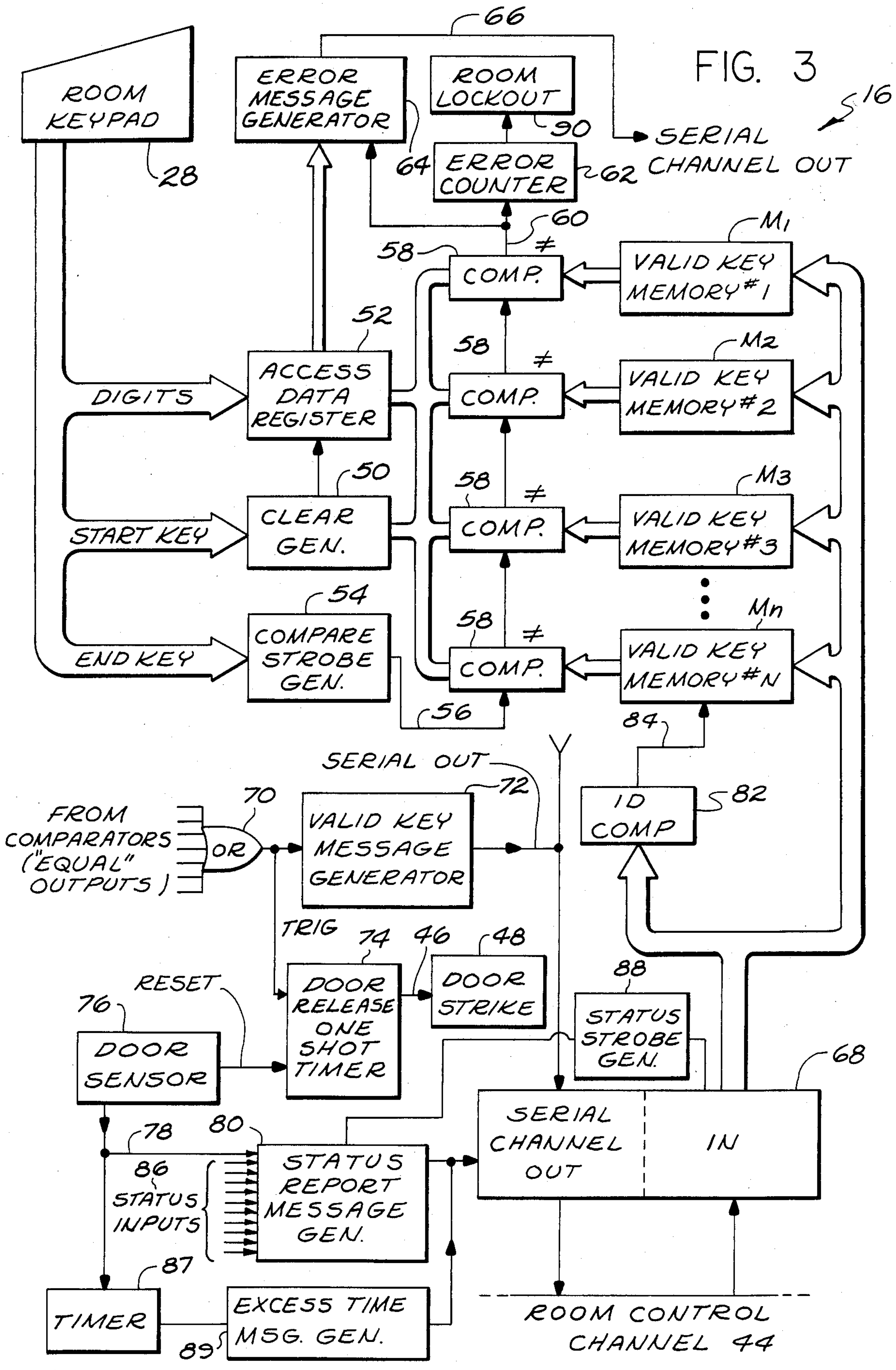
FIG. 3 is a block diagram depicting the principal functions performed within the room station of FIG. 1.

FIG. 3 illustrates the detailed functional makeup of each room station 16, and particularly the controller 20 which has "key memory" locations $M_1$ through $M_n$ containing valid access codes or "key" numbers for comparison to data entered on the room keypad 28. Each room station has a plurality of memory locations for storing guest access codes and a plurality of memory locations for storing staff access codes. In the preferred embodiment, the numbers of locations for guest and staff codes are four and seven, respectively.

As mentioned above, numbers entered on the room keypad are preceeded by an asterisk (START KEY) and followed by a pound symbol (END KEY). The START KEY activates a "clear" generater 50 to empty an access data register 52. Digits entered at the room keypad are then stored in the register 52. The END KEY activates a "compare" strobe generator which sends a timing signal along a path 56 to trigger an array of individual comparitors 58 associated with the key memories $M_1$–$M_n$. Each of the comparitors 58 performs a digit-for-digit comparison of the contents of the access data register 52 with the contents of the corresponding key memory M. This is accomplished in software by executing a simple "subtract" instruction. If a stored access code has less than nine digits, the unused memory locations are left in the "clear" state to signify the absence of a digit. A match is then found by the comparitor 58 only if the number in the access data register 52 has both the same digits and the same length as the code in one of the valid key memories.

If the contents of the access data register 52 do not match any of the stored access codes, an error signal passes along a path 60 to an error counter 62 and an error message generator 64. The error message generator 64 sends an "error" message, which typically includes the contents of the entry data register 52, along a path 66 to a serial channel 68. This message passes to the floor controller 18 which relays it to the central station 14 for storage and analysis. However, if the contents of the access data register 52 matches any of the stored access codes, a signal generated by the appropriate comparitor is applied to an input of an "or" gate 70. The output of the "or" gate is applied to a valid key message generator 72 and a door release one-shot timer 74. The generator 72 sends a "valid key" message to the control station 14 along the serial channel 68 and the timer 74 activates the door strike mechanism 48 to unlock the door with which the room station is associated. The timer 74 holds the door strike mechanism 48 in an unlocked condition for a preselected period of time, typically a few seconds or until it receives a reset signal from a door sensor 76 which indicates that the door has been opened and reclosed. Information as to opening and closing of the door is also applied to a first input 78 of a status report message generator 80 which applies a status report message to the serial channel 68 for transmission to the applicable floor controller.

The access codes within the key memories $M_1$–$M_n$ are transmitted to the room station 16 from one of the desk stations 12 or the central station 14 by way of the rizer bus 26, the floor controller 18 and the floor bus 44 of FIG. 2. The room station 16 receives the message through the serial channel 68 and applies it to an ID comparitor 82 and the valid key memories $M_1$–$M_n$. The ID comparitor 82 examines the message to determine whether it is intended for the particular room station. If so, it sends a "load" signal along a path 84 to the appropriate key memory location, causing the access code to be stored. If the ID comparitor determines that the message is not intended for the room station 16, it does not send a load signal and the contents of the key memories are not disturbed.

Another function of the room station 16 is to provide information as to its status and that of the door that it controls. For this purpose, the room station 16 generates a plurality of signals indicative of the status of the station, such as whether specific memory locations are filled, whether the room station is receiving electrical power, and whether the station is in the act of comparing entered data to stored access codes. These signals are applied to a plurality of additional inputs 86 of the status report message generator 80 to send a message indicating the status out along the serial channel 68 whenever a status strobe generator 88 is activated. The status strobe generator 88 is controlled by an incoming interrogation message from the floor controller 18 or the central station 14. It includes an ID comparitor (not shown) similar to the comparitor 82 of the access code storage means and sends an appropriate signal to the status report message generator when an interrogation message is received.

The room station 16 also has a timer 87 which responds to the output of the door sensor 76 to time a period during which the associated room door is open. When the door remains open for more than a preselected period of time, the timer 87 signals an excess time message generator 89 which advises the floor controller 18 or the central station 14 of the condition. This is important because an open door indicates a breach of security.

The error counter 62 counts error signals generated by repeated entries of access data which does not match the stored access codes and activates a "lock-out" feature 90 when a preselected number of error messages are received. The element 90 temporarily prevents the room station 16 from activating the door strike 48 until the lock-out has been overridden. The number of erroneous entries which give rise to a lock-out is arbitrary, but is preferably on the order of three. This prevents an unauthorized person from opening the room door by successive data entries on a trial-and-error basis.

Figure 6:
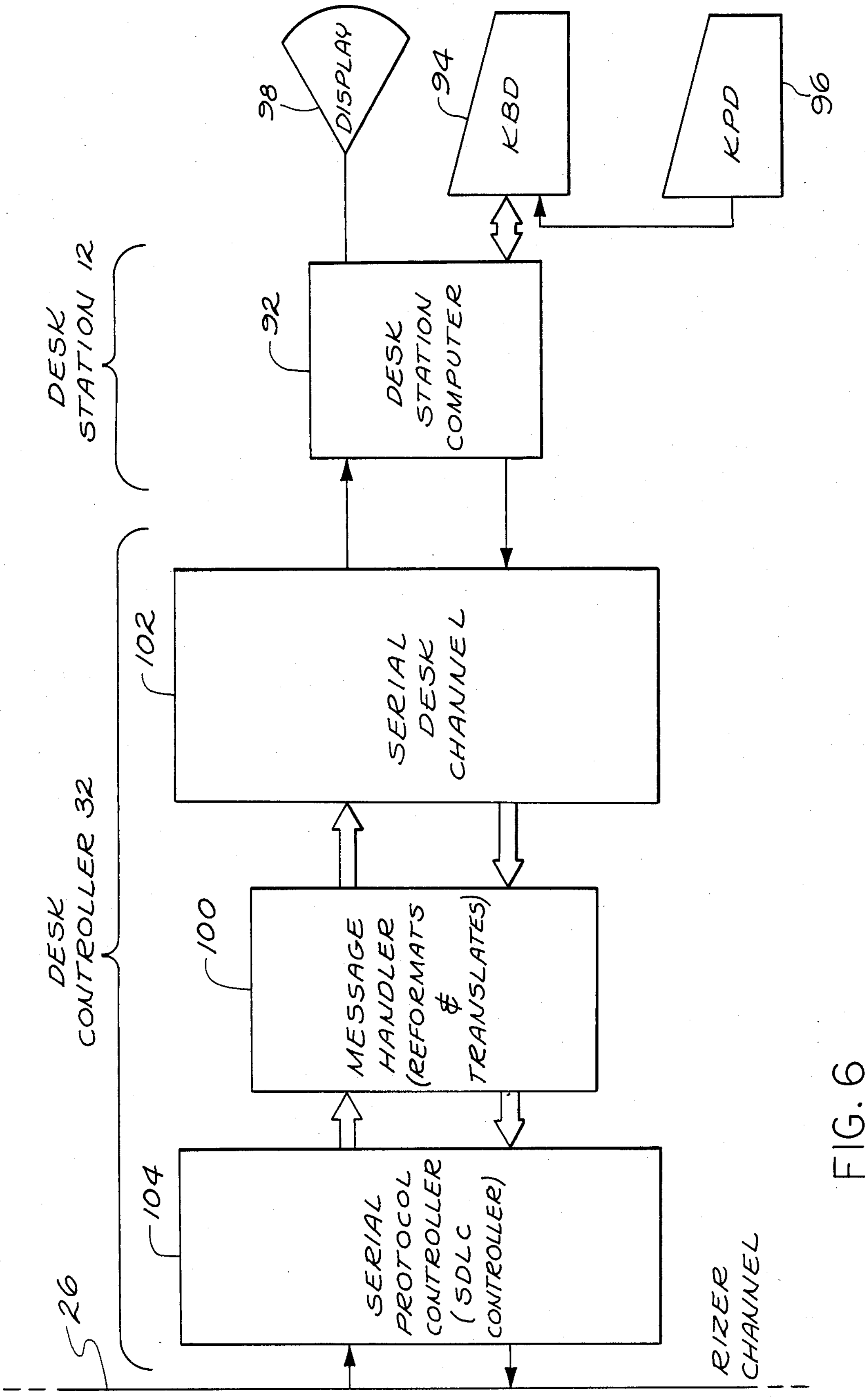
FIG. 6 is a functional block diagram depicting functions performed by the desk station of FIG. 1.

As discussed in connection with FIGS. 1 and 2, each of a plurality of desk stations 12 communicates with the rizer channel 26 through a desk controller 32 to store access codes and guest information at the room stations 16 and the central station 14. The desk station 12 and the desk controller 32 are illustrated in more detail in FIG. 6, wherein the desk station 12 comprises a desk station computer 92, a desk keyboard 94, a desk keypad 96 and a display device 98. The keyboard 94 and the keypad 96 are connected to the desk station computer for entry of an access code, a guest identification number and a room identification number, as discussed above. The access code is entered on the keypad 96 and can be any number of the guest's choice between four and nine digits, and the guest and room information are entered on the keyboard 94 by the desk clerk. The desk computer 92 functions primarily as a message assembler and transmitter for transmission of information to the desk controller 32 and eventually the rizer bus 26. A portion of the information received by the desk station computer 92 from the keyboard 94 and the keypad 96 is displayed by the device 98, which may be a video display terminal associated with the desk keyboard 94. In the preferred embodiment only the guest and room information are displayed at the desk station. This maximizes security by not disclosing the chosen access code to anyone other than the guest and the central station.

The desk controller 32 includes a message handler 100, a serial desk channel 102 and a serial protocol controller 104. The message handler reformats and translates the information received from the desk station computer, placing it in a protocol compatible with the central controller 30 and the floor controllers 18. In doing so, it translates the room number entered by the desk clerk on the keyboard 94 to a floor controller identification number and a room station identification number understandable to the floor controllers 18. It also generates a copy of the message containing the same information but addressed to the central controller 30.

The message handler 100 is a microprocessor which transmits and receives data in parallel, while the rizer bus 26 and the desk station computer 92 are designed for serial data streams. Thus, the serial desk channel 102 acts as a serial in/out channel interfacing the message handler 100 with the desk station computer 92, and the serial protocol controller 104 is a form of serial channel compatible with the rizer bus 26 to interface it with the message handler 100. The elements 100, 102 and 104 are all capable of bi-directional communication; however, the principal flow of information through these elements is in the direction from the desk station computer 92 to the rizer bus 26 to store access codes.

The serial desk channel 102 and the serial protocol controller 104 are conventional serial channels available commercially as IC chips. They consist primarily of shift registers and synchronizing logic. The timing and transfer of information to and from these channels is controlled by the microprocessor of the message handler 100.

Figure 7:
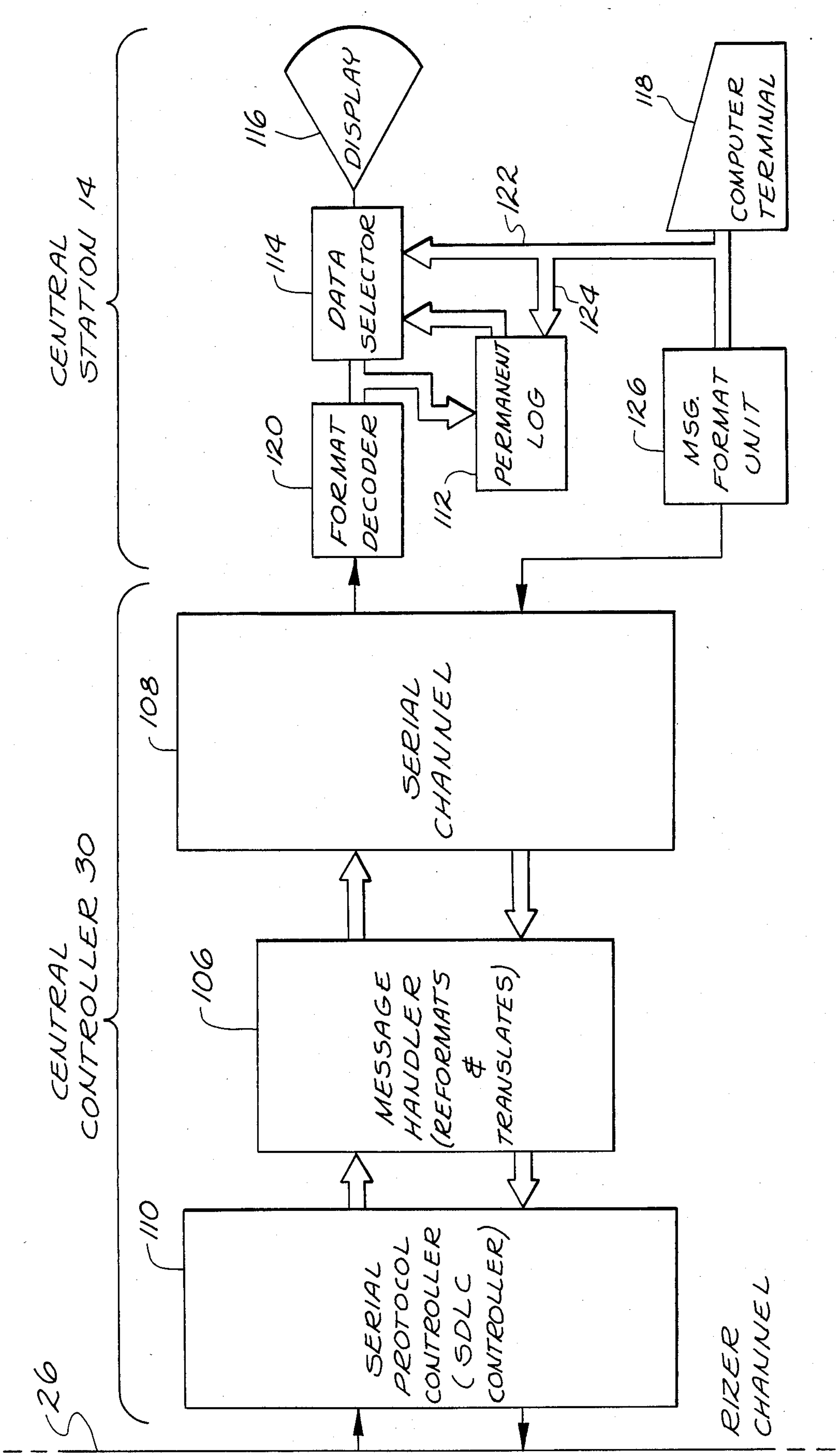
FIG. 7 is a generalized block diagram depicting functions performed by the central station of the system of FIG. 1.

FIG. 7 illustrates the central station 14 and the central controller 30 which are capable of storing guest and staff access codes, receiving and logging information as to activity and status at the room stations 16, and acting to "lock-out" unauthorized persons attempting to enter the guest rooms. The central controller 30 is substantially the same as the desk controller 32 in that it contains a bidirectional message handler 106 and a pair of bidirectional serial channels 108 and 110 which interface the message handler between the central station 14 and the rizer bus 26. The central station 14 is preferably a desk-top computer which includes at least the functional elements of a permanent log 112, a data selector 114, a display device 116 and a terminal 118. When a message is reformatted and translated by the message handler 106 from the form that is transmitted along the rizer bus 26, it passes through the serial channel 108 to a format decoder 120 which decodes the message for storage in the permanent log 112 and possible display by the device 116. The data selector 114 determines which portions of the input data are displayed. This is done according to input from a keyboard of terminal 118 along a path 122. Transactions within the permanent log 112 can also be reviewed on the display device 116 in response to suitable control signals from the terminal 118 to the permanent log 112 along a path 124.

The central station 14 is capable of controlling the room stations 16 and interrogating them for status by messages generated at the terminal 118. These messages are "coded" by the message format unit 126 which relays them through the central controller 30 to the rizer bus 26. In the process of relaying the messages, the central controller 30 places them in the format and translates them into the coding required along the rizer bus 26.

Figure 5:
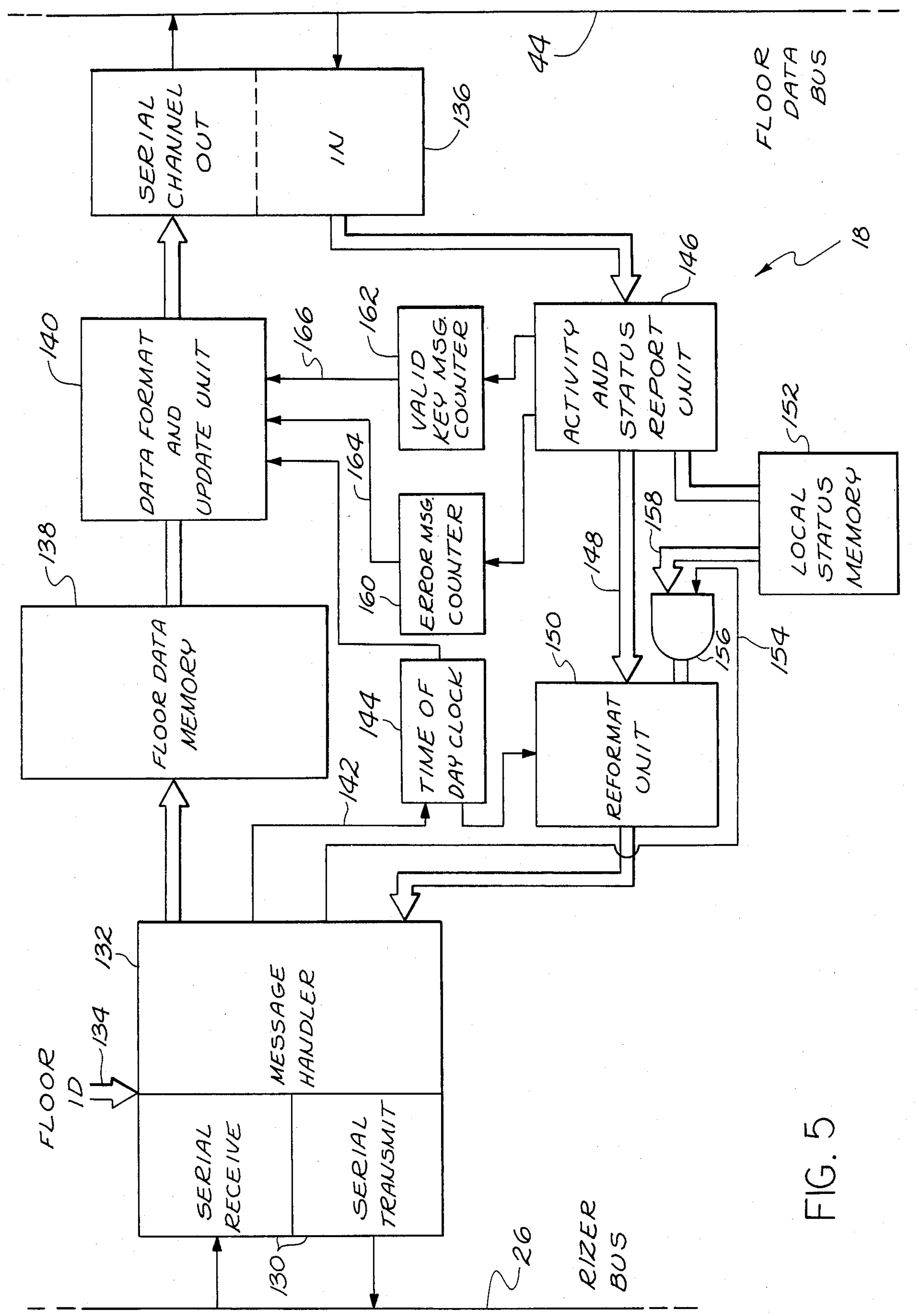
FIG. 5 is a functional block diagram depicting functions performed by a floor controller of the system of FIG. 1.

FIG. 5 illustrates the functional components of each floor controller 18 to implement the functional features of the system 10. The floor controller 18 is important to the system in that it detects when a message is addressed to a controller on its floor, reformats and relays the message to the proper room station along the floor bus 44, and updates the access codes stored in memory at the room stations in response to activity and status changes within the system.

Referring specifically to the elements of FIG. 5, messages are received from the rizer bus 26 by a serial in/out channel 130 combined with a message handler 132. The combination of the serial channel 130 and the message handler 132 contains in memory a number 134 used to identify messages intended for a room station 16 on the floor. Those messages are reformatted by the message handler portion 132 for relay to the room stations along the floor bus 44. The combination of the serial channel 130 and the message handler 132 corresponds generally to the message handler 100 and the serial protocol controller 104 of the desk controller 32. Thus, the serial channel is, in essence, a set of shift registers and synchronizing logic similar to those described above. It is controlled by the microprocessor of the message handler to collect one bit at a time and output the information in parallel, typically 8 bits at a time. A serial in/out channel 136 is provided adjacent to the floor bus 44 to perform the function of the serial desk channel 102 in transforming between parallel data transfer and a serial bit stream.

The message handler 132 stores messages received from the rizer bus 26 in a floor data memory 138, from which they are transmitted to a data format and update unit 140. Thus, floor data memory 138 maintains a duplicate copy of the access codes for each room station on the floor, as well as information as to whether each access code is intended for a guest or a staff person and as to the time zones within which the access codes are valid. The data format and update unit 140 transforms the same information to the format of a message identifiable by the room station or room stations for which it is intended, and transmits the message along the floor bus 44 via the serial channel 136.

The "time stamp" portion of each message, which occupies the last field of the message in the form described in FIG. 4, is also extracted by the message handler 132 upon receipt of a message over the rizer bus 26. This information is transmitted along a path 142 to a time of day clock 144 which updates the format and update unit 140 as to time. The unit 140 periodically reexamines the time zones stored within the floor data memory 138 to determine whether any of the key memories at the room stations 16 require updating. It repeatedly validates and invalidates the access codes in the key memories so that each code is valid only during the periods that it is intended to be valid. This is preferably accomplished by repeatedly storing and erasing the codes in key memory.

Thus, the information transmitted from a floor controller to a room station 16 is not strictly "relayed" to the floor stations. Rather it is stored and retransmitted to the room stations as required to keep the key memories up to date. As is true for all messages in the system 10, the general format of the updating messages is similar to that of FIG. 4A. The source and destination are contained within the message, along with an access code, a guest or staff ID code, a flag identifying the message as a key memory update, and a time stamp portion. Of course, the precise format of the message varies constantly within the system as the message passes from one element to another. This can be accomplished in a number of ways, as long as format and coding are appropriately controlled to make the message understandable.

The floor controller 18 also includes an activity and status report unit 146 which receives messages from the floor stations through the serial channel 136. The report unit 146 transmits all activity information contained in the message along a path 148 to a reformat unit 150. The reformat unit compiles the information and transmits it periodically to the message handler 132 in response to input from the time of day clock 144. The message handler 132 and the serial in/out channel 130 reformat the information into a serial message compatible with the rizer bus 26. The message is eventually received by the central controller 30 which again reformats and translates it so that it can be logged by the central station 14 (FIG. 7). Status information is treated somewhat differently, in that it is stored in a local status memory 152 and transferred to the reformat unit 150 only in response to an interrogation signal from the central station 14 along a path 154. The gating of status information to the reformat unit is indicated functionally by an AND gate 156 to which the interrogation signal and a local status memory bus 158 are inputs. The interrogation signal is generated periodically by the central station 14 to log the status of the room stations 16 over time.

The activity and status report unit 146 receives error messages and valid key messages from the room units 16 along the floor bus 44. Each room unit counts invalid data entries at its own keypad but does not know how many times a nearby keypad might have been tried unsuccessfully. For this reason, an error message counter 160 and a valid key message counter 162 of the floor controller 18 receive input as to the number of erroneous key entries and valid key entries which have been made on the keypads of the various room stations. In the simplest embodiment, the error message counter 160 counts the number of error messages received from all or any number of the room stations on the floor and generates a lock-out signal along a path 164 to the data format and update unit 140 whenever a preselected number of permissible error messages is exceeded. This causes the data format and update unit to generate a message "locking out" or disabling a desired number of room stations on the assumption that an unauthorized person is attempting to gain entry by random entry of digits. Once lock-out occurs, it can be overridden by an appropriate message from the central station 14 or by entry of a valid key number a preselected number of times. This results in the same number of valid key messages to the counter 162 and causes an "unlock" command to be applied to the data format and update unit 140. The unit 140 generates a message to override the lock-out and reenable the room stations.

In a more sophisticated form, the error message counter 160 independently counts and evaluates each error message according to the severity of the error. This is possible because the error message contains the number entered on the guest keypad and the correct access codes are stored in the floor data memory 138 of the floor controller. If the entered number differs drastically in content or length from all valid access codes, it indicates that an unauthorized person is attempting to enter a room. Similarly, if one or more erroneous entries differ only slightly in content and have the correct length, it is likely that an authorized person has merely made a mistake in entering his code.

From the foregoing, it is apparent that the data format and update unit 140 is an important part of the floor controller 18. In response to input from the time of day clock 144, it sequences through a series of steps to keep the key memories of the room stations up to date, to set and clear the time zones status of the access codes, and to lock out one or more room stations in response to instructions from the central station or feedback from the room stations.

Figure 8:
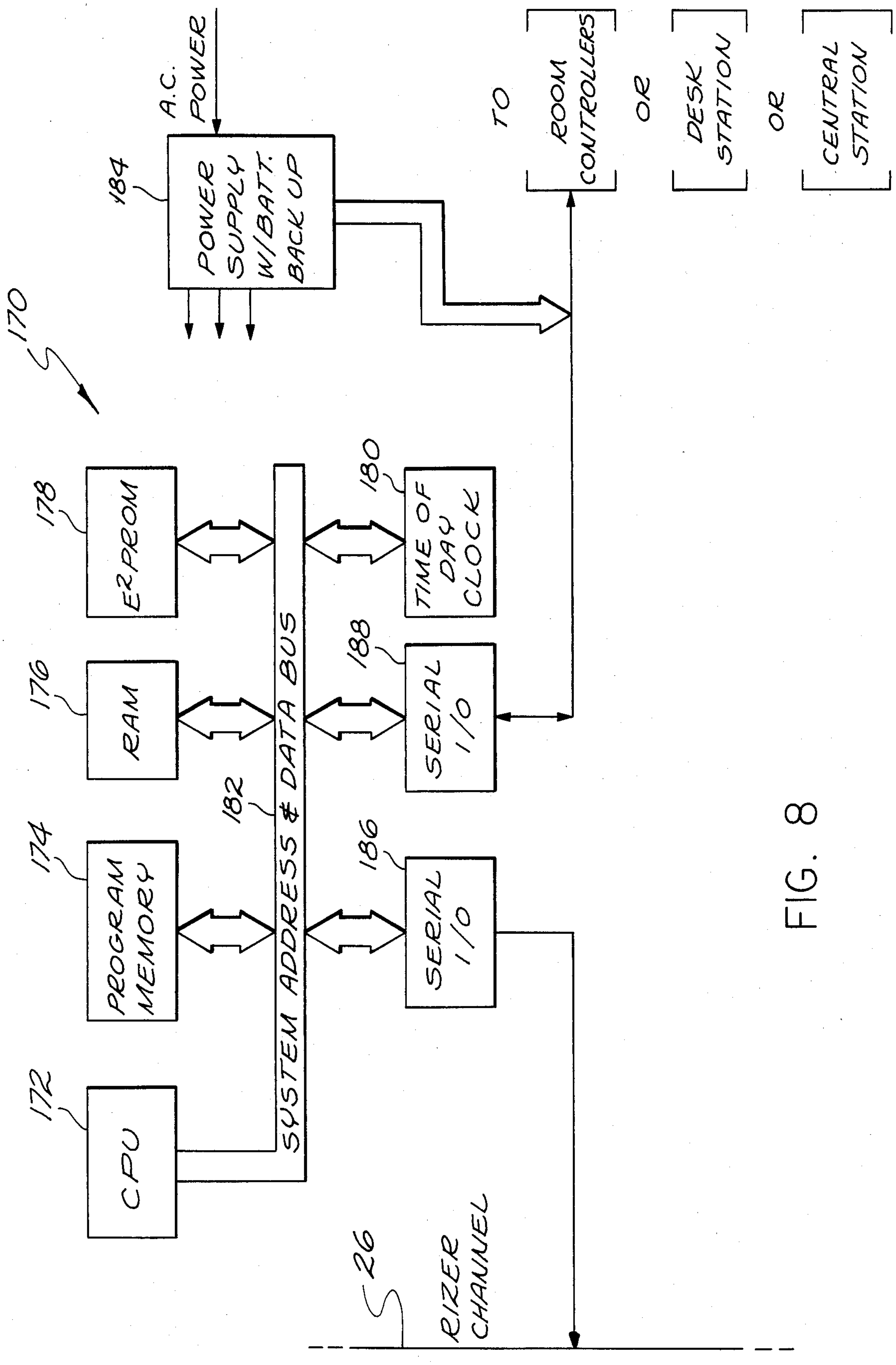
FIG. 8 is a generalized block diagram of the hardware common to the floor controllers, the desk controllers and the central site controller of FIGS. 1 and 2.

The central control 30, the desk controller 32 and each of the floor controllers 18 contain a microprocessor with local memory to store, reformat, translate, transmit and act on information passed along the rizer channel 26. The general hardware configuration suitable for each of these units is illustrated generally in FIG. 8 and designated 170. It includes a central processing unit (CPU) 172, a program memory 174 for the operating system program of the CPU, a random access memory (RAM) 176, an $E^2$PROM 178 and a time of day clock 180, all connected through a system address and data bus 182. Power is provided through a power supply 184. Each of the controllers also has a pair of serial in/out channels 186 and 188 for interfacing the processing unit between the rizer channel 26 and the room controller or other station with which it is associated. The serial channels 186 and 188 are similar to the serial channels 102, 104, 108, 110, 130 and 136 of FIGS. 5–7, depending upon which controller is being considered. The hardware used for the controller 170 can be any form of custom or conventional hardware able to perform the functions described herein. A commercially available unit suitable for this purpose is sold under the designation SBC 86/20 by Intel Corporation.

Figure 9:
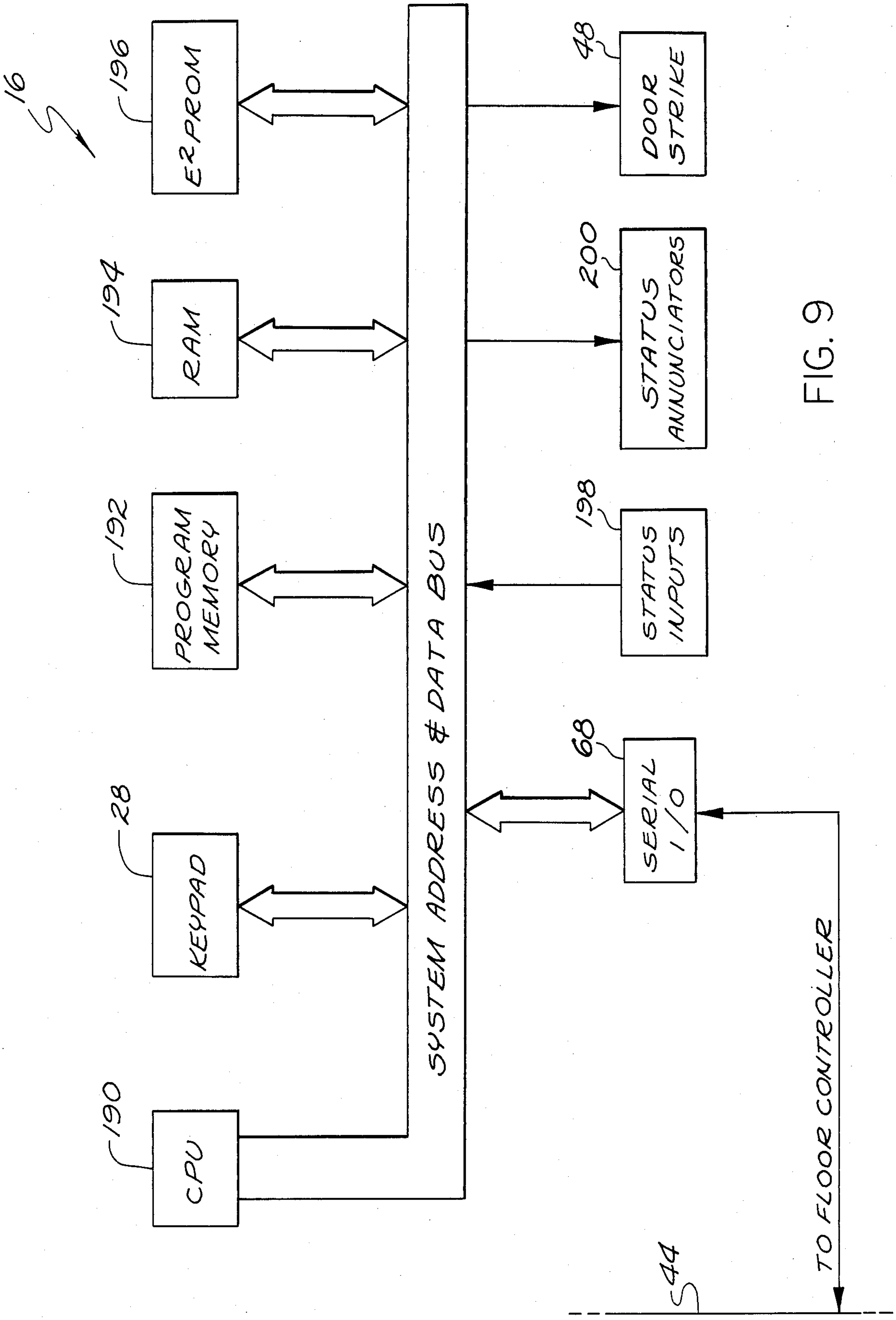
FIG. 9 is a generalized block diagram of the basic hardware of each room station depicted in FIGS. 1 and 2.

The hardware of the room stations 16 differs slightly from that of the various controllers and is illustrated generally in FIG. 9. That configuration includes a CPU 190, a program memory 192, a RAM 194 and an $E^2$PROM 196. The keypad 28, the serial in/out channel 68 and the door strike 48 are also included in the room station 16, as are a plurality of status input devices 198 and a plurality of status annunciators 200. The status input devices 198 include the status inputs 86 and 78 to the status report message generator 80 of FIG. 3. The status annunciators 200 are a series of LED's or other suitable devices for indicating status to the user of the keypad.

The central station 14 is preferably an IBM PC/XT computer with keyboard and printer. In that case, the computer and keyboard comprise the central computer 38 and the data input 42 of the central station 14, and the printer and computer memory make up the activity log 40 of the central station. Similarly, the desk station is preferably a combination of an Epson HX40 computer and a slave keypad similar to the room keypad 28. The HX40 computer corresponds to the desk terminal 24.

As far as the room unit is concerned, the basic processor is preferably Model No. 8749 manufactured by Intel Corporation. It possesses all required memory, and additional support chips for use as power supplies, line drivers for communication lines, light drivers and isolation amplifiers can be added as needed. The keypad itself is preferably a simple 12-button keypad identical in layout to those used on touch-tone telephones.

The system 10 is a message-oriented communication system having different protocols at different points to accommodate requirements of the various stations and controllers. All channels are bidirectional and serial in nature.

The most fundamental communication channel is that along the rizer bus 26 between the central controller 30, the desk controller 32 and the floor controllers 18. It has an RS-422 electrical specification and uses protocol and bit coding according to the synchronous data link control (SDLC) specification of IBM. SDLC is a "transparent" protocol which transports information as a unit, much like a packet-switching network, without regard to the form in which the information is embodied. In this sense, it is a protocol without coding.

The floor buses 44 are designed to a convenient custom electrical specification, and information is transmitted according to a serial asynchronous bit format. The coding is according to the ASCII format of the American National Standards Institute. Thus, the floor bus 44 is an asynchronous channel insofar as the bit coding of characters is concerned. This means that at that level there is no formal protocol. The bits may be assembled into bytes by combining characteristics of time domain multiplex (TDM) and polling message and response systems. The overall content protocol, which defines the meaning of the information transmitted, is a message oriented protocol in which the address of the intended recipient as well as the source of the message is embedded within its content. This is shown conceptually in FIG. 4.

The central controller 30 communicates with the central station 14 according to a serial protocol having RS 232 electrical characteristics and an asynchronous bit format. The coding is ASCII, as in the floor bus, and the protocol is a message and acknowledge format. This is appropriate because the central controller 30 and the central station 14 are connected by a dedicated link.

The desk controller 32 and the desk stations 14 are connected by a bus having pseudo-RS 232 electrical characteristics, i.e., conforming generally to RS 232 specifications and an asynchronous bit format. The coding is ASCII and the protocol is similar to that of the floor bus 44.

The operation of the system 10 is apparent from the foregoing discussion, wherein it is pointed out that a guest access code is chosen by the guest and entered by him on the desk station keypad 22 without anyone else knowing what it is. For this reason, the desk keypad 22 is positionable sufficiently far from the desk terminal 24 to ensure privacy when entering the number. It is preferably located on one side of a small partition at the front desk of a hotel with the desk terminal 24 located on the other side. When a guest enters a chosen identification number from four to nine digits in length, the clerk enters a room assignment number and certain guest information which are passed to the desk controller 32 along with the access code. The desk controller 32 places the information in a form compatible with the rizer bus 26 and transmits it along the rizer bus to the floor controller 18 and the central controller 30. The central controller 30 relays the information to the central station 14 where it is logged, while the floor controller 18 stores the information in its own memory and relays it to the room stations 16 with which it is associated. If a message is intended for a particular room station, the access code contained within it is stored at the appropriate key memory location ($M_1$–$M_n$) of the station.

When a four- to nine-digit number is later entered on the keypad 28 of the room station 16, it is loaded into the register 52 (FIG. 3) and compared to the codes of the valid key memories $M_1$–$M_n$. If a match occurs, the door release timer 74 causes the door strike mechanism 48 to unlock the room door at which the station is located. A valid key message is also transmitted through the floor controller 18 to the central station 14. The door strike remains open until the timer 74 "times out" or the door sensor 76 senses that the door has been opened and closed. When the data in the register 52 does not match any of the access codes within the key memory, an error signal is generated. Successive erroneous entries at the same room station trigger the room lock-out function 90 when a preselected count is reached. Error signals generated at all room stations within a group are transmitted to the central station 14 by the floor controller in the same manner as the valid entry signal, and are counted by the error message counter 160 of the floor controller. After a preselected number of erroneous messages on the floor, the data format and update unit 140 sends a "lock-out" message to the room station. Successive valid key messages during the lock-out period are counted on the valid key message counter 162, which sends an "unlock" message to the room station after a second preselected count is reached.

The central station 14 receives and records all messages within the system to maintain a permanent log for security purposes. It also interrogates the floor controller 18 for status information contained within the memory 152 by sending an interrogation message which causes an interrogation signal to be applied to the gate 156 of the floor controller (FIG. 5). The central station can store or erase any guest or staff access code from memory at the room stations but cannot directly unlock a door at a room station. That can be accomplished only by entry of a valid data sequence at the keypad of the room station. In addition, each of the room stations is a complete stand-alone unit able to operate with or without the other elements of the system 10. Although the activity and status reporting functions of the system and the storage of codes can be hindered by a system malfunction, no single malfunction will lock guests out of a large number of rooms or leave rooms unlocked for any length of time.

The system also implements a number of other useful features, including entry of "partial master" access codes from a central location to provide staff members with access to specific rooms in which they have business but deny them access to other rooms of the complex. This is done by storing the one staff access code at the room station 16 of each room in which the person belongs. Unlike a system in which mechanical keys are used, it is not necessary that the rooms to which access is provided coincide with a level of the usual master/-grand master hierarchy.

One of the room stations 16 can be used at an auxiliary room door to control access to an entire floor or a specific facility, such as a gymnasium or a swimming pool. In that case, the room station has a more extensive memory which contains access codes for all persons entitled to be on the floor or in the controlled facility. The central station 14 can program and erase access codes to keep such an auxiliary controller up to date with guest status.

From the above, it can be seen that there has been provided a high security system for controlling access through a large number of doors without the nuisance of mechanical keys or "card keys". The system is highly versatile, reports all system activity and status at the rooms to a central station, and is not susceptible to large scale inconvenience or reduction of security if a component of the system malfunctions.

While certain specific embodiments of the invention have been disclosed as typical, the invention is not limited to those particular forms, but rather is applicable broadly to all such variations as fall within the scope of the appended claims. As an example, the specifications and protocols of the communication channels described in the preferred embodiment are but one example of a number of possibe schemes using existing communication protocols. Also, it is possible in some smaller installations that the desk station 12 will double as the central computer 14, reducing the cost of system hardware.

What is claimed is:

1. A system for seouring a complex having a desk location and a plurality of lockable access points, comprising:

at least one disk station at the desk location, each desk station having first and second desk keypad means;

a remote station at each of said access points, each remote station having a remote station keypad, said remote stations being divided into a plurality of groups;

means for providing bidirectional communcation between the desk station and the remote stations;

the desk station comprisnig: means for receiving an access code entered on the first desk keypad means and a location code entered on the second desk keypad means; means for generating and transmitting serial messages containing the access code and the location code over the communication means;

each remote station having local storage and data processing means comprising: means responsive to messages containing a preselected location code characteristic of the remote station to receive and store access codes contained within said messages; means for receiving access data entered on the keypad of the remote station and comparing the access data to the access codes stored at the remote station; means for generating a signal to unlock the access point at which the remote station is located if the access data matches one of the access codes; and a plurality of controller stations, each controller station being associated with one of the groups of remote stations and being responsive to messages containing preselected location codes which identify remote stations within said one group to relay the messages to the identified remote stations.

2. A security system of claim 1 wherein:

the means for receiving and storing access codes at a remote station comprises means for maintaining a plurality of access codes in storage.

3. The security system of claim 2 which further comprises:

means for causing at least one of the access codes to be valid only during preselected periods of time; and the remote station is responsive to entry of data corresponding to said one access code to unlock the associated access point only when the access code is valid.

4. The system of claim 2 which further comprises:

means for transmitting at least one staff access code to a plurality of said remote stations for storage, so that entry of access data matching the staff access code at any of said plurality of remote stations causes the access point at which said remote station is located to be unlocked.

5. The security system of claim 4 wherein:

the means for transmitting staff access codes and the means for receiving and storing access code information at the remote stations are constructed and arranged so that a preselected staff code can be stored at any combination of the remote stations.

6. The security system of claim 4 wherein:

the means for transmitting a staff access code to said plurality of remote stations comprises a central security station.

7. The security system of claim 1 wherein the controller station further comprises:

means for storing time zone data for at least one of said access codes, the time zone data signifying preselected periods of time during which said at least one access code is valid to unlock an access point; and means for monitoring and periodically updating the access codes stored at the remote stations according to said time zone data.

8. The security system of claim 1 wherein:

each location code contains a controller portion which identifies one of said groups and a station portion which identifies a remote station within said group; and each controller station is constructed and arranged to respond to messages containing a controller portion which identifies the controller station by relaying the messages to the remote stations with which the controller station is associated; and each remote station is constructd and arranged to respond to messages containing a station portion which identifies the remote station by receiving and storing information as to the length and content of the access codes contained in the messages.

9. The security system of claim 1 wherein:

the remote stations incorporate locking structure so that each access point can be unlocked only by entry of access data at the remote station located there and so that the remote stations continue operation to control access through the access points even if the desk station and the controller station malfuncntion.

10. The security system of claim 9 which further comprises:

a central security station; and the communication means is a serial network connecting the security station with each desk station, controller station and remote station of the system.

11. The security system of claim 10 wherein:

the remote stations further comprise means for reporting data entries on each of the remote keypad means over said network means; and the security station comprises means for receiving and recording said reported data entries.

12. The security system of claim 11 wherein:

said means for reporting data entries reports each remote keypad data entry as either a valid attempt or an invalid attempt to unlock the access point at which a remote station is located.

13. The security system of claim 12 wherein:

the controller station includes means for receiving and storing the reported data entries and means for disabling the unlocking mean of a remote station in response to a preselected number of invalid attempts to unlock the access point at which the remote station is located.

14. The security system of claim 13 wherein:

the disabling means is responsive to a preselected number of attempts to unlock access points associated with different remote stations within one of said groups.

15. A system for securing a complex having a service desk and a plurality of guest rooms with locking means, said complex having at least one auxiliary door through which guests registered in a plurality of different guest rooms may be entitled to pass, comprising:

at least one desk station having first and second desk keypad means positionable so that a guest can enter a room access code of his selection on the first of said keypad means without disclosing the access code to a clerk operating the second of said keypad means;

a room station at each of said guest rooms, each room station having a room keypad for entry of access data;

local area network means for providing bidirectional communication between the desk station and the room stations;

the desk station comprising: means for receiving an access code of variable content and variable length entered by the guest on the first desk keypad means and a location code entered by the clerk on the second desk keypad means; means for generating and transmitting serial messages of predetermined length containing an access code and a location code over the network means;

each room station having local storage and data processing means comprising: means responsive to messages from said means for generating said messages containing a preselected location code characteristic of the room station, said means responsive to messages operating to receive and store information as to the length and content of access codes contained within said messages; means for receiving access data entered on the room keypad of the remote station and comparing its length and content to the information at the room station; means for generating a signal to unlock the guest room at which the room station is located if the access data matches the information stored for one of the access codes; and an auxiliary station is provided at each of the auxiliary doors and is connected to the desk station and the room stations by said network means, each auxiliary station having: means for receiving and storing information as to the length and content of at least one access code transmitted by the desk station along the bidirectional communication means; auxiliary keypad means for entry of access data at the auxiliary station; means for receiving said access data and comparing its length and content to the stored information; and means for unlocking the auxiliary door if the access data matches the information stored for one of the access codes.

16. The security system of claim 15 wherein:

said locking structure and said means for generating are isolated so that the guest room at which it is located can be unlocked only by entering data at the room keypad associated with it.

17. The system of claim 16 which further comprises:

a central security station connected with each desk station and each room station of the system by the network means;

means for reporting data entries on any of the room keypad means to the security station; and means for recording said data entries and any unlocking of guest roooms at the security station.

18. The security system of claim 17 which further comprises:

means for monitoring the status of each guest room, including whether doors to the guest rooms are open or closed; and means for recording said status at the security station.

19. The security system of claim 16 wherein:

the means for receiving and storing access codes at a room station comprises means for maintaining a plurality of access codes in storage.

20. The security system of claim 19 which further comprises:

means for causing at least one of the access codes to be valid only during preselected periods of time; and the room station is responsive to entry of data corresponding to said one access code to unlock the associated guest room only when the access code is valid.

21. The security systems of claim 19 which further comprises:

means for transmitting at least one staff access code to a plurality of said room stations for storage so that entry of access data matching the staff access code at any of said plurality of room stations causes the associated guest room to be unlocked.

22. The security system of claim 21 wherein:

the means for transmitting staff access codes and the means for receiving and storing access code information at the remote stations are constructed and arranged so that a preselected staff code can be stored selectively at any combination of the remote stations.

23. The security system of claim 15 wherein:

the receiving and storing means of the auxiliary station has sufficient capacity to store a different access code for each of the room stations.

24. The security system of claim 16 wherein:

the room stations are divided into a plurality of groups; and the system further comprises a plurality of controller stations, each controller station being associated with one of the groups and having independent storage and data processing means responsive to preselected location codes which identify room stations within said one group to relay access codes to the identified room stations along the network means.

25. The security system of claim 24 wherein the controller station further comprises:

means for storing time zone data for at least one of said access codes, the time zone data signifying preselected periods of time during which said at least one access code is valid to unlock a guest room; and means for monitoring and periodically updating the access code information stored at the room stations according to said time zone data.

26. The security system of claim 24 wherein:

each location code contains a controller portion which identifies one of said groups and a room portion which identifies a room station within said group; and each controller station is constructed and arranged to respond to messages containing a controller portion which identifies the controller station by relaying the messages to the room stations with which the controller station is associated; and each room station is constructed and arranged to respond to messages containing a room portion which identifies the room station by receiving and storing information as to the length and content of the access codes contained in the messages.

27. The security system of claim 24 wherein:

the room stations compare access data to stored information and unlock guest rooms without communicating with any other stations of the system, and to continue operating to control access to the rooms even if the desk station and the controller station malfunction.

28. The security system of claim 27 wherein:

the system further comprises a central security station connected by the bidirectional network means to the desk station, the controller stations and the room stations of the system;

the controller stations include means for periodically interrogating the room stations as to status, including whether the doors to the guest rooms are open or closed;

each room station includes means for transmitting status information to the controller station that interrogates it; and the security station comprises means for receiving and recording said status information.

29. The security system of claim 28 wherein:

at least one of the room stations includes means for timing a period during which a door of the associated guest room remains open and means for transmitting information as to the duration of said period over the network means; and the security station comprises means for activating an alarm when the duration exceeds a preselected maximum.

30. The security system of claim 29 wherein: the security station includes:

means for storing a flag indicating that it is acceptable for the door to at least one preselected guest room to be left open for extended periods; and means for preventing the security station from activating the alarm when said door is left open.

31. The security system of claim 16 which further comprises:

a central security station connected by the network means to the desk station, the controller stations, and the room stations of the system;

means for reporting each room keypad data entry to the security station as either a valid attempt or an invalid attempt to unlock the associated guest room; and means for disabling the unlocking means of a room station in response to a preselected number of invalid attempts to unlock said station.

32. The security system of claim 31 wherein:

the room stations are divided into a pluralty of groups; and the disabling means is responsive to a preselected number of attempts to unlock guest rooms associated with different room stations within one of said groups.

33. The security system of claim 32 wherein:

the disabling means disable the unlocking means of a plurality of room stations which do not coincide with room stations of one of said groups.

34. The security system of claim 31 which further comprises:

means for re-enabling the unlocking means which have been disabled by entering of a preselected re-enabling code.

35. The security system of claim 34 wherein:

the re-enabling means re-enable the locking means when a valid entry code is entered a preselected number of times in succession at a room station at which it is stored.

* * * * *